3,238,555
DEVICE FOR CLEANING OR DE-ICING A SURFACE OF A SOLID BODY, IN PARTICULAR WINDSCREEN WIPER FOR WINDSCREEN
André Marie Joseph Cels, 48 Rue de la Concorde, Ixelles, Belgium
Filed July 16, 1964, Ser. No. 383,075
Claims priority, application Germany, July 26, 1963, C 30,547
8 Claims. (Cl. 15—250.04)

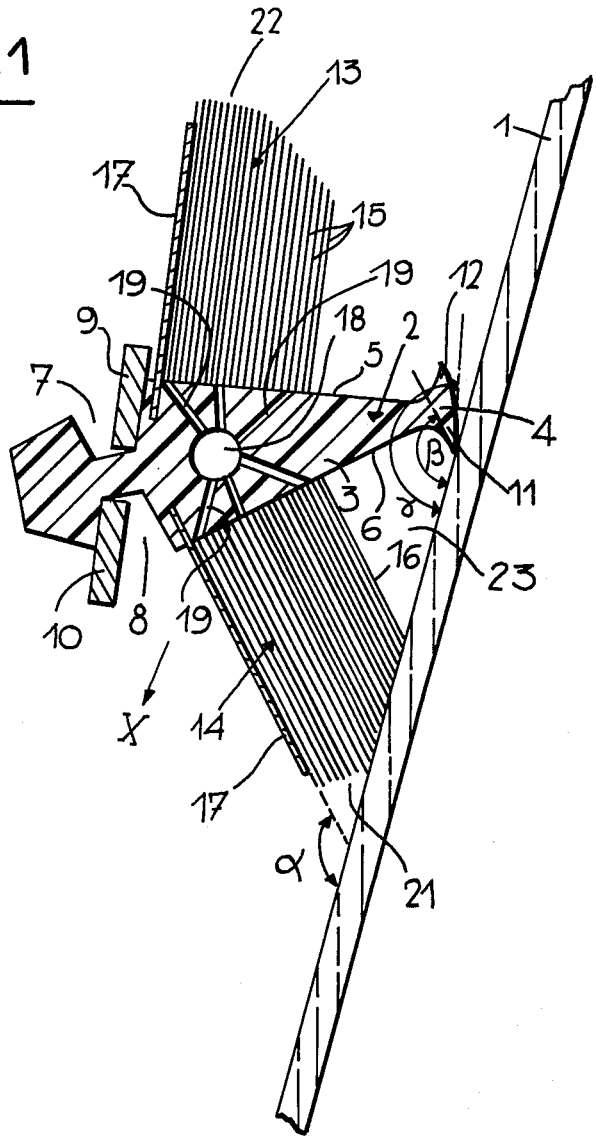

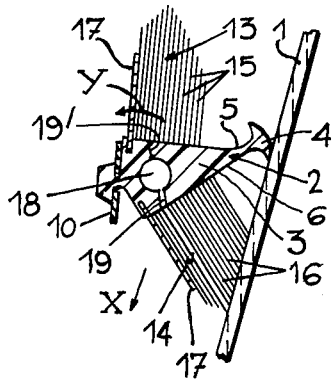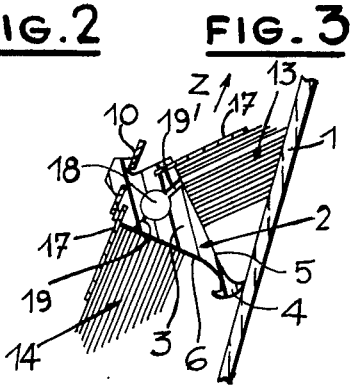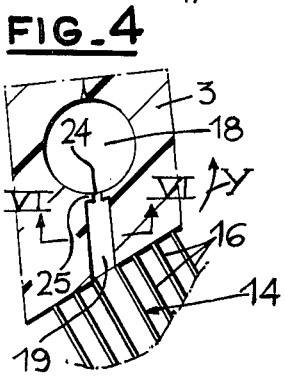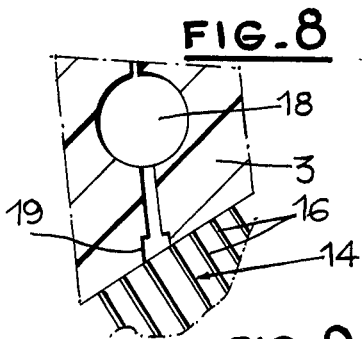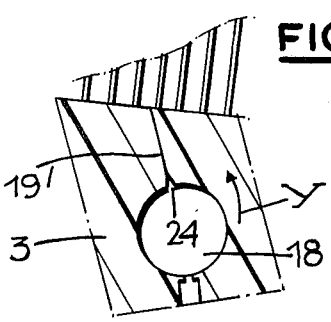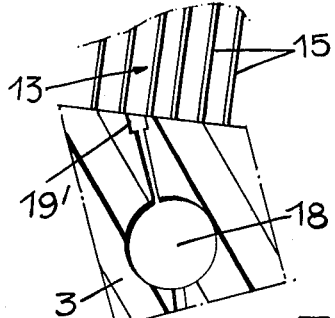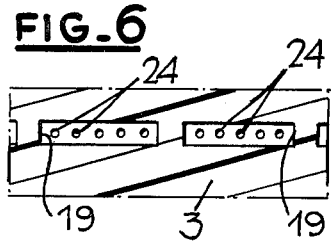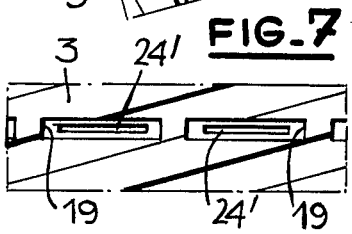

The present invention relates to a device for cleaning or de-icing a surface of a solid body, such as a glass panel, in particular to a windscreen wiper for the surface of a windscreen (comprising at least one wiper, preferably in the form of a flexible blade, having at least one free edge which is displaced upon contact with this surface. The invention has the object of improving such a device ensuring a more effective and quicker cleaning of the surface in question, regardless of the matter adhering to it, which can be hard or soft, adherent of loose, dry or wet, greasy or non greasy, frozen or not frozen.

In the case of outer surfaces of motor car windscreens, windscreen wipers have already been proposed which consist solely of a flexible blade having a wiping but not a scooping edge. Furthermore, there are also windscreen wipers with a flexible wiping but not scooping blade, provided laterally with auxiliary flexible blades, the object of which consists mainly in clearing the surface of the windscreen without effectively cleaning it, before the wiping blade passes over it. These auxiliary blades serve particularly to scrape away the snow or ice sticking to the windscreen.

It is known that such flexible blades are not particularly effective when it is of importance to free the windscreen quickly of soft, oily or greasy particles.

Further, such devices involve the risk of scratching the windscreen by rubbing, or by causing hard particles among the soft particles to slide thereon. Furthermore, these conventional blades spread drops of rain or of liquid cleaning agents on the windscreen in a more or less thin and uniform layer as a result of the contact pressure of the windscreen wiper on the wndscreen, and in relation with the state of the edge of these blades, whilst at the same time the latter spread the swept-off and freed matter onto said windscreen.

When these particles in suspension in the liquid layer are not greasy, they are spread in the form of a more or less dense mud but if they are greasy or oily, such as the splashes of road traffic, they are crushed, spread or emulsified by the passing blade.

Thus, on a windscreen swept by a conventional blade, greasy areas in the form of arcs or circular sectors are formed, which are apparent already when the surface is dry, or in the form of greasy films almost monomolecular, very adherent and generally transparent and invisible when dry.

These greasy areas are not wetted by the rain or by the cleaning liquid, not even a detergent. Consequently, after the passage of the blade, the liquid which has been spread out by the blade, more or less effectively, is again immediately re-formed after the blade's passage in the form of myriads of droplets of infinitely small dimensions of the order of the thickness of the layer of liquid or humidity which is not removed by the blade, and according to the porosity or irregularities of the edge thereof.

The areas in question having become luminous by the direct illumination of the myriads of droplets by the headlights of on-coming traffic, thus form a luminous screen or veil which prevents the driver discerning through this screen or veil less luminous objects which obstruct his path.

The invention has the object of overcoming these disadvantages.

For this purpose, in a new cleaning and de-icing device, and particularly in a windscreen wiper according to the invention, the free edging part of the wiper consists of a scooping member acting on the surface to be cleaned or de-iced.

According to a feature of the invention, said wiper is provided laterally with a brush, the bristles of which are displaced upon contact with said surface at an obtuse angle of attack, in front of its scooping member with respect to the direction of displacement thereof on this surface, in order to brush this surface efficiently prior to the scooping-up action.

Generally, the scooping member is provided with brushes, disposed preferably symmetrically on each side of said wiper.

A new so constructed windscreen wiper permits a rapid and efficient removal and/or dissolving of particules adhering to the windscreen, whatever the nature and size of these particles may be, due to a brushing action in the useful or necessary presence of a non-detergent, detergent or also an antifreeze liquid, dependent on circumstances.

Any impurity constituting an obstacle to the passage of the extremity of a bristle of the brushing device is subjected to a rapidly increasing thrust due to the resistance of the bristle to axial compression.

It will be apparent that the bristles are fixed to the lateral surfaces of the blade with scooping member, in a sufficiently dense manner and over a sufficient width, in order that upon the passage of the brushes, each particle of matter will be in the path of one or more bristle extremities, whatever its position on the surface to be cleaned may be.

Each impurity or particle adhering to the windscreen, thus constitutes an obstacle to at least one extremity of a bristle, and is subjected to an almost instantaneously increasing thrust due to the resistance of the corresponding bristle to its axial compression.

Dependent on the type of the impurity and the form of the extremity of the bristle (chisel, knife, burin, spade, shovel, ploughshare, sharp or blunted tip, etc.) the contact between the impurity and the bristle is punctiform, linear, or over a very reduced surface, so that the specific pressure in the area of contact is relatively high.

As long as this impurity sticks to the surface to be cleaned, it is successively subjected to the stumbling action, and then to the thrust, of a series of bristles having extremities generally of different shapes, and coming into contact with it in different places, in such a manner that, according to its shape, nature and consistency, the particle, at the scale of its size, is subjected to a very rapid succession of attempts of all kinds to dislodge, detach or disintegrate it, these attempts being thus accordingly comparable to a lateral thrust, shovelling up, digging, shearing, penetrating, cutting to pieces, ploughing, etc.

The particle, if not detached, is subjected upon the next passage of the blade to similar actions from other bristles having generally again different shapes, but, this time, in the opposite direction. This alternation of directions of said actions favours the final dislodging and detachment of said particle.

This effect of brushing or scrubbing (cleaning by brushing in different directions) is to be compared with the said wiping action of a conventional blade, the edging part of which is very flexible and also rounded due to its construction or wearing, is necessarily pushed away from the windscreen by the layer of liquid which is compressed and spread out by said blade passing thereover at an acute angle. In the course of such a wiping action, the edging part tends to loose contact with the particles sticking to the windscreen, which are immersed within the thickness of this liquid layer and do not project up to the surface of the spread out layer, whilst said edging part is worn irregularly because of projecting asperities.

Due to the present invention, the bristles of the brushes in motion, by being inclined forwardly, penetrate into the layer of the liquid in the manner of a spade, and constantly maintain contact with the surface of the windscreen. Due to this fact, they force the liquid to move round them. There results an intensive mechanical agitation of the ambient liquid, precisely in the immediate vicinity of the areas where the extremities of the bristles stumble against any impurities or particles which may be present.

This mechanical agitation is not only very useful for a maximum wetting of the adherent particles and eventually for decreasing their adhesion, but also for lubricating them completely, once they are detached. This agitation also facilitates the carrying away of said particles by the vortices of the liquid in the spaces between the bristles, outside the areas in which the extremities of the bristles exert a relative high specific pressure on the surface of the windscreen.

This mechanical agitation of a detergent liquid upon the passage of the bristles and of their extremities in contact with the windscreen, is necessary when the dissolving of particles, contaminations or impurities of a greasy or oily nature is concerned.

This intensive mechanical agitation of the detergent liquid takes place, in fact, in the immediate vicinity of the areas where the surface of the greasy particle or greasy film is attacked by the extremities of the bristles, and brings a constantly renewed surface of the greasy layer into contact with a quantity of liquid which is also constantly renewed. The dissolving of the impurities of the layers and of the films of greasy materials by the detergent liquid, is thus carried out more efficiently and rapidly, the thinner, the more spread and consequently the more dangerous, these layers or films to be removed, are.

For the same reasons, the intensive agitation of the surrounding liquid is likewise very useful and even necessary in order to cause the snow or ice particles sticking to the windscreen to melt, by employing a liquid having antifreeze properties.

It should here be noted that the brushing device at an obtuse angle, involves no danger of scratching the windscreen by rubbing or by rolling detached hard particles against it.

No possibility exists, in fact, that a hard particle, after having yielded to the dislodging caused by an extremity of a bristle, should not be rejected or carried away into the free space surrounding the bristles, and should remain interposed between an extremity of a bristle and the surface of the windscreen.

According to a further feature of the invention, the brush or each brush has its bristles situated on the side opposite the wiper, which bristles are trimmed so that they have a front chamfer. This feature permits regulation and adjustment of the ease of penetration by inertia of the liquid adhering to the windscreen into the intervals between the bristles, and thus a control of its flow across the aggregate of bristles in the direction opposite to that of the displacement of the wiper or flexible blade.

The air current meeting the moving blade and which, for example in the case of conventional blades, tends to detach them from the windshield by rushing into the acute angle formed by the blade with the windscreen, has on the contrary, in the present case, a very advantageous effect, which consists of increasing the pressure of the bristles in contact with the windscreen.

According to a further feature of the invention, the wiper is provided laterally with one or more membranes placed against the brushes, on the opposite side of the wiper.

The membrane in question assists the deflection of the air current and the effect of thrusting.

This membrane can be semi-rigid or rigid if the device has to sweep plane surfaces. This membrane is preferably supple if the device has to sweep convex or concave surfaces.

In order to collect the scooped liquid, the brush in contact with the surface to be cleaned delimits together with said surface and with the scooping member also in contact with said surface, a space open at least at one of its extremities, whereby the liquid can be evacuated outside the surface to be cleaned.

Since the presence of cleaning liquid all over the area to be brushed, and hence a convenient distribution of this liquid is very important, the invention provides a feed of this liquid via a central passage and a distribution of this liquid via lateral passages. These internal passages in the flexible blade are calibrated in such a manner that an adequatae feed of liquid soaks the assembly of bristles of the brush or brushes.

Such a feed by internal passages to the blade, distributes the cleaning liquid conveniently over the whole surface to be swept, so that enough of the liquid reaches all areas of this surface situated in the path of the bristles of the working brush, and consequently, wets the entirety of the surface to be cleaned.

This manner of feeding the brush with cleaning liquid via internal calibrated passages of the blade, does not have the drawbacks of the conventional methods for wetting the windscreen prior to the passage of the blade, since the jet of liquid is no longer subjected to variable air currents and no longer distributes the liquid on the windscreen in a non-uniform manner, with the consequence that certain regions of the windscreen are improperly or not at all wetted, and that other regions are excessively sprayed.

One can furthermore restrain the consumption of liquid during a cleaning operation, in making use of a device by which the said distribution passages have, at least over a portion of their length, a sufficiently small dimension so that, taking into account the yieldability of the surrounding matter, they are at least partially choked, on the side of the idle brush, by the squeezing of said matter under the effect of the torsional stress undergone by the blade during its cleaning operation, whereas the distribution passages on the side of the working brush are maintained open as a result of same torsional stress.

Other details and features of the invention will be apparent in the course of the description of the accompanying drawings, which shows diagrammatically and by way of example only, four embodiments of a cleaning device according to the invention.

FIGURE 1 is a transverse cross section through an embodiment of a cleaning device according to the invention.

FIGURES 2 and 3 are transverse cross sections similar to those on FIGURE 1, showing the behaviour of distribution passages of another embodiment of the cleaning device according to the invention, for the two directions of its displacement.

FIGURES 4 and 5 are enlarged views of parts of FIGURES 2 and 3 respectively.

FIGURE 6 represents a detail sectional view on line VI—VI of FIGURE 4.

FIGURE 7 is a detail sectional view similar to that of FIGURE 6, showing distribution passages having another form of inlet aperture.

FIGURES 8 and 9 are enlarged views similar to those of FIGURES 4 and 5, showing another embodiment of the distribution passages.

In the various figures, like numerals designate like parts.

The device shown on FIGURE 1 is, in fact, a windscreen wiper intended to clean the windscreen 1 of a vehicle. This windscreen wiper comprises a wiper consisting of a flexible blade 2 formed from a material of yieldable nature such as rubber. It has a symmetrical profile. It is displaced on the windscreen 1, alternately in the direction of the arrow X, and in the opposite direction.

The blade 2 consists of a body 3 and an edging part 4. The body 3 has lateral surfaces 5 and 6 converging towards the edging part 4. On the opposite side, the body has two opposite grooves 7 and 8, in which two members 9 and 10 respectively of the driving means for the blade 2 engage, intended to serve as stops for the blade in its two inclined positions, corresponding to the cleaning of the windscreen 1.

The edging part 4 has two ribs 11 and 12, with which it scoops the liquid adhering to the windscreen 1 alternately in the two directions of displacement of the windscreen wiper. For this purpose, each rib has a sharp working edge which, in contact with the windscreen, serves to detach the liquid layer situated thereon, flush with its outer surface, for scooping up this layer in the manner of a scoop or shovel, and for evacuating it then laterally. Thus, the rib has a cross section which at its sharp edge and in the vicinity thereof, is substantially an acute angle, each side of which forms an obtuse angle β or γ with the outer surface of the windscreen, with respect to the direction of displacement of the blade 2.

According to the invention, the blade 2 carries brushes 13 and 14 which are respectively fixed to two lateral surfaces 5 and 6 by being mounted perpendicularly thereon.

The bristles 15 or 16 of the brush 13 or 14 are in contact with the windscreen 1 when the blade 2 scoops the latter with one of the sharp edges of its edging part 4. The action of said bristles on the windscreen 1 is effected prior to the scooping action of the edging part on said windscreen with respect to the direction of displacement of the windscreen wiper thereon. As can be seen on FIGURE 1, the windscreen 1 is thus submitted to a brushing action originating from one of the brushes, i.e. the brush 14, before being subjected to the scooping action of the sharp edge of the rib 11. In order to obtain an energetic brushing action and, especially, to allow the free extremities of the bristles conveniently to enter into the layers of materials adhering to the windscreen 1, said bristles 15 or 16 are inclined in the working position to the windscreen 1 at an obtuse angle of attack. Preferably, the bristles 15 or 16 of each brush 13 or 14 which are located on the side opposite to the blade 2, are trimmed at 21 and 22 in a manner such as not to be in contact with the windscreen 1 while this is brushed. The body 3 of the blade 2 carries elastic membrances 17, placed respectively against the brushes 13 and 14 on the side opposite this blade or in front of said brushes with respect to the direction of displacement of the windscreen wiper on the windscreen.

The presence of such membranes facilitates the deflection of the air flow encountered by the blade 2, and in this way reinforces the contact pressure of said blade on the windscreen.

In order to collect and to evacuate the liquid scooped by the edging part 4, the brush 14 in contact with the surface 1 forms a free space 23 with said surface 1 and with the blade 2, in contact with said surface by the sharp edge of the rib 11 of its edging part 4.

As the free space 23 is open at the two extremities, the polluted liquid collected in this manner can freely flow away outside the surface to be cleaned.

In order to be able to feed to the windscreen 1 a liquid, which can be detergent or anti-icing, the body 3 of the blade 2 has a central passage 18 for the feed of this liquid, and lateral passages 19 for the distribution of said liquid. The latter communicate with the central passage 18 and open into the lateral surfaces 5 and 6 in those parts of such surfaces where the brushes 13 and 14 are mounted. The above-said liquid is thus led between the bristles of the brushes, which allows to limit and adequately distribute the quantity of liquid utilized.

On another hand, the apertures of the distribution passages 19 located on the side of the idle brush 13 can be closed, at least partially, under the effect of the compression of the blade 2 during its operation. In said case, the flow of liquid is restricted or suppressed on the side of said idle brush.

FIGURE 2 represents another embodiment of the device according to the invention, of which only one distribution passage 19 is shown on the side of the working brush 14, and also only one distribution passage 19' on the side of the idle brush 13. The passage 19 is kept open under the effect of the flexion of the blade 2 in the direction of the arrow Y. This flexion is due to the reaction undergone by the bristles 16 of the brush 14 and by the edging part 4 when they are driven in the direction of the arrow X parallel to the windscreen 1.

Said flexion has also the effect of compressing the matter of the body 3 surrounding the distribution passage 19'. Due to the minute dimension of such distribution passage in the direction in which this compressing effect is exerted, and due to the yielding characteristics of the matter which constitutes the body 3, such a compression causes the squeezing of the distribution passage 19' and, as a consequence, the liquid fed through the central passage 18 cannot any more flow toward the idle brush 13, during the working stroke of the brush 14.

When such a device is displaced on the windscreen in the opposite direction i.e. in the direction of the arrow Z of the FIGURE 3, the flexion of the blade 2 also changes direction, with the result that the distribution passage which was designated by numeral 19' on FIGURE 2 is now open, whereas the distribution passage designated 19 on the same FIGURE 2 is now closed. The idle brush 14 on the FIGURE 3, to its turn, ceases to be fed by the liquid during the working stroke of the brush 13.

The FIGURES 4 and 6 show that the distribution passage 19 communicates with the central feeding passage 18, by some small holes 24 provided through a thin membrane 25. The thickness of such membrane as well as the diameter of the holes 24 are, for example, of some tenths of a millimeter.

The FIGURE 5 shows that the distribution passage 19' and the holes 24 are closed, as is the distribution passage 19' on the FIGURE 2.

On FIGURE 7, the communication between distribution passages 19 and the central feeding passage is represented to consist of thin slots 24'. Such slots are also squeezed when the matter surrounding them is subjected to compression as a result of the flexion of the blade within which said slots are set.

FIGURE 8 shows a distribution passage between the central feeding passage 18 and the brush 14 having a very small dimension over a great portion of its length. When the yieldable matter of the body 3 around the distribution passage is subjected to compression as a result of the flexion of the blade, said passage is squeezed but remains partially open as shown on FIGURE 9. In that case, the quantity of liquid flowing towards the idle brush 13 is less than the quantity of liquid reaching the same brush when it is working.

It will be apparent that the invention is not exclusively limited to the embodiment shown and that many modifications can be applied to the shape, disposition and construction of certain elements involved in its production, provided that these modifications are not contradictory to the object of each of the following claims.

What I claim is:

1. Device for cleaning or de-icing a surface of a solid body, such as a glass panel, in particular a windscreen wiper for the surface of a windscreen, comprising at least one wiping member, preferably in the form of a flexible blade, having at least one free edging part which is displaced upon contact with this surface, said edging part comprising at least one rib having a sharp edge in contact with this surface and moving against said surface at an obtuse angle in order to scoop the liquid located thereon, said wiping member comprising laterally a brush, the bristles of which are displaced upon contact with said surface at an obtuse angle of attack, in front of its edging part with its scooping edge with respect to the direction of displacement of the latter on the surface, in order to brush said surface effectively prior to the scooping action thereon.

2. Device for cleaning or de-icing a surface of a solid body, such as a glass panel, in particular windscreen wiper for the surface of a windscreen, comprising at least one wiping member, preferably in the form of a flexible blade, having at least one free edging part which is displaced upon contact with this surface, said edging part comprising at least one rib having a sharp edge in contact with this surface and moving against said surface at an obtuse angle in order to scoop the liquid located thereon, said wiping member comprising brushes disposed on each side, the bristles of said brushes being displaced alternately upon contact with said surface at an obtuse angle of attack, in front of said edging part, with respect to the direction of displacement of the latter on the surface, in order to brush said surface effectively prior to the scooping action thereon.

3. Device according to claim 2 in which said brushes are disposed symmetrically with respect to the wiping member.

4. Device for cleaning or de-icing a surface of a solid body, such as a glass panel, in particular a windscreen wiper for the surface of a windscreen, comprising at least one wiping member, preferably in the form of a flexible blade, having at least one free edging part which is displaced upon contact with this surface, said edging part comprising at least one rib having a sharp edge in contact with this surface and moving against said surface at an obtuse angle in order to scoop the liquid located thereon, said wiping member comprising laterally a brush, the bristles of which are displaced upon contact with said surface at the obtuse angle of attack, in front of its edging part with its scooping edge with respect to the direction of displacement of the latter on the surface, in order to brush said surface effectively prior to the scooping action thereon, said brush having its bristles on the side opposite the wiping member trimmed so as to provide a front chamfer.

5. Device for cleaning or de-icing a surface of a solid body, such as a glass panel, in particular a windscreen wiper for the surface of a windscreeen, comprising at least one wiping member, preferably in the form of a flexible blade, having at least one free edging part which is displaced upon contact with this surface, said edging part comprising at least one rib having a sharp edge in contact with this surface and moving against said surface at an obtuse angle in order to scoop the liquid located thereon, said wiping member comprising laterally a brush, the bristles of which are displaced upon contact with said surface at an obtuse angle of attack, in front of its edging part with its scooping edge with respect to the direction of displacement of the latter on the surface, in order to brush said surface effectively prior to the scooping action thereon, said wiping member being provided laterally with one membrane placed against the brush on the side opposite to said wiping member.

6. Device for cleaning or de-icing a surface of a solid body, such as a glass panel, in particular a windscreen wiper for the surface of a windscreen, comprising at least one wiping member, preferably in the form of a flexible blade, having at least one free edging part which is displaced upon contact with this surface, said edging part comprising at least one rib having a sharp edge in contact with this surface and moving against said surface at an obtuse angle in order to scoop the liquid located thereon, said wiping member comprising laterally a brush, the bristles of which are displaced upon contact with said surface at an obtuse angle of attack, in front of its edging part with its scooping edge with respect to the direction of displacement of the latter on the surface, in order to brush said surface effectively prior to the scooping action thereon, said brush in contact with said surface forming with said surface and with said wiping member a free space for collecting and evacuating the scooped liquid.

7. Device for cleaning or de-icing a surface of a solid body, such as a glass panel, in particular a windscreen wiper for the surface of a windscreen, comprising at least one wiping member, preferably in the form of a flexible blade, having at least one free edging part which is displaced upon contact with this surface, said edging part comprising at least one rib having a sharp edge in contact with this surface and moving against said surface at an obtuse angle in order to scoop the liquid located thereon, said wiping member comprising laterally a brush, the bristles of which are displace upon contact with said surface at an obtuse angle of attack, in front of its edging part with its scooping edge with respect to the direction of displacement of the latter on the surface, in order to brush said surface effectively prior to the scooping action thereon, said wiping member having a feed passage for a cleaning medium and distribution passages for this medium communicating with this feed passage and opening into said brush.

8. Device according to claim 7, in which said distribution passages have, at least over a portion of their length, a sufficiently small dimension so that, taking into account the yieldability of the surrounding matter, they are at least partially choked, on the side of the idle brush, by the squeezing effect of the torsional stress undergone by the blade during its cleaning operation, whereas the distribution passages on the side of the working brush are maintainend open as a result of same torsional stress.

References Cited by the Examiner

UNITED STATES PATENTS

| | | | |
|---|---|---|---|
| 229,430 | 6/1880 | Linscott | 15—245 |
| 1,771,824 | 7/1930 | Storrie | 15—250.4 |
| 2,107,567 | 2/1938 | Grece | 15—250.4 |
| 2,179,454 | 11/1939 | Paulus | 15—250.4 |
| 2,582,717 | 1/1952 | Pierce | 15—250.4 |
| 3,082,464 | 3/1963 | Smithers | 15—250.42 |
| 3,088,155 | 5/1963 | Smithers | 15—260.42 |

FOREIGN PATENTS

| | | |
|---|---|---|
| 854,398 | 1/1940 | France. |
| 1,128,714 | 8/1956 | France. |
| 461,560 | 2/1937 | Great Britain. |

CHARLES A. WILLMUTH, *Primary Examiner.*